(12) United States Patent
Okumatsu

(10) Patent No.: US 11,469,631 B2
(45) Date of Patent: Oct. 11, 2022

(54) ROTOR AND METHOD OF MANUFACTURING THE SAME

(71) Applicant: TOYOTA JIDOSHA KABUSHIKI KAISHA, Toyota (JP)

(72) Inventor: Yoshihiro Okumatsu, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/004,166

(22) Filed: Aug. 27, 2020

(65) Prior Publication Data

US 2021/0119507 A1 Apr. 22, 2021

(30) Foreign Application Priority Data

Oct. 17, 2019 (JP) .............................. JP2019-190400

(51) Int. Cl.
*H02K 1/27* (2022.01)
*H02K 15/03* (2006.01)
*H02K 1/276* (2022.01)

(52) U.S. Cl.
CPC ........... *H02K 1/2773* (2013.01); *H02K 15/03* (2013.01)

(58) Field of Classification Search
CPC ....... H02K 1/2773; H02K 15/03; H02K 1/278
See application file for complete search history.

(56) References Cited

U.S. PATENT DOCUMENTS

2014/0084731 A1* 3/2014 Iwami .................... H02K 15/03
                                                              310/156.07
2015/0001970 A1   1/2015 Zhang et al.

FOREIGN PATENT DOCUMENTS

| CN | 105790468 A | * | 7/2016 |
|----|-------------|---|--------|
| JP | 2007-028734 A | | 2/2007 |
| JP | 2007-151321 A | | 6/2007 |
| JP | 2010-098891 A | | 4/2010 |
| JP | 2015-525051 A | | 8/2015 |

* cited by examiner

*Primary Examiner* — Thomas Truong
(74) *Attorney, Agent, or Firm* — Oliff PLC

(57) ABSTRACT

A rotor that is downsized while achieving high output of the electric motor is provided. The rotor includes a plurality of main magnets and a plurality of auxiliary magnets. The auxiliary magnets are fit into a plurality of respective grooves formed along a rotation shaft direction in an outer periphery of a rotation shaft arranged at the center of the rotor, are projected from the outer periphery of the rotation shaft to an outer side of a radial direction, and have a magnetization direction along a circumferential direction of the rotor. Magnetic field directions of the auxiliary magnets that are adjacent to each other are opposite to each other in the circumferential direction. The main magnets are arranged in projected parts of the auxiliary magnets that are adjacent to each other and have a magnetization direction that is along the radial direction of the rotor.

1 Claim, 15 Drawing Sheets

ROTOR AND METHOD OF MANUFACTURING THE SAME

CROSS REFERENCE TO RELATED APPLICATIONS

This application is based upon and claims the benefit of priority from Japanese patent application No. 2019-190400, filed on Oct. 17, 2019, the disclosure of which is incorporated herein in its entirety by reference.

BACKGROUND

The present disclosure relates to a rotor and a method of manufacturing the same.

An electric motor including a stator having coils and a rotor having magnets has been known. Published Japanese Translation of PCT International Publication for Patent Application, No. 2015-525051 discloses a configuration of a rotor in which bar-shaped magnets are radially arranged with respect to a rotation shaft, sector magnets are auxiliarily arranged between the bar-shaped magnets that are adjacent to each other, and a Halbach array is formed of a plurality of bar-shaped magnets and a plurality of sector magnets in the circumferential direction. Published Japanese Translation of PCT International Publication for Patent Application, No. 2015-525051 further discloses that gaps between the plurality of bar-shaped magnets and the plurality of sector magnets are sintered by rare earth metallic powders.

SUMMARY

In the structure of the rotor disclosed in Published Japanese Translation of PCT International Publication for Patent Application, No. 2015-525051, in order to fix the plurality of bar-shaped magnets and the plurality of sector magnets in respective predetermined positions, it is required to secure an area sintered by the rare earth metallic powders on the inner side of the radial direction (rotation shaft side) of the bar-shaped magnets and the sector magnets in the cross section that is perpendicular to the rotation shaft direction. However, when the rotor has the structure as disclosed in Published Japanese Translation of PCT International Publication for Patent Application, No. 2015-525051, there is a limit on downsizing the rotor while maintaining high output of the electric motor.

The present disclosure has been made in view of the aforementioned circumstances and aims to provide a rotor that is downsized while achieving high output of the electric motor.

A rotor according to one embodiment of the present disclosure is a rotor including a plurality of main magnets and a plurality of auxiliary magnets, in which the auxiliary magnets are fit into a plurality of respective grooves formed along a rotation shaft direction in an outer periphery of a rotation shaft arranged at the center of the rotor, are projected from the outer periphery of the rotation shaft to an outer side of a radial direction, and have a magnetization direction along a circumferential direction of the rotor, magnetic field directions of the auxiliary magnets that are adjacent to each other are opposite to each other in the circumferential direction, the main magnets are arranged in projected parts of the auxiliary magnets that are adjacent to each other and have a magnetization direction that is along the radial direction of the rotor, magnetic field directions of the main magnets that are adjacent to each other are opposite to each other in the radial direction, and the plurality of main magnets and the plurality of auxiliary magnets are arranged in such a way that the main magnets and the auxiliary magnets form a Halbach array in the circumferential direction of the rotor.

The plurality of main magnets and the plurality of auxiliary magnets are arranged so as to form the Halbach array in the circumferential direction. By forming the Halbach array by the plurality of main magnets and the plurality of auxiliary magnets in the circumferential direction, it is possible to prevent the magnetic flux from the main magnets from intruding into the side of the rotation shaft, whereby it is possible to improve the output of the electric motor. The auxiliary magnets are rigidly positioned in the rotor since the auxiliary magnets are fit into the respective grooves of the rotation shaft. Further, when the main magnets are arranged between the projected parts of the auxiliary magnets that are adjacent to each other, the main magnets are also rigidly positioned in the rotor since the main magnets receive a suction force from the rotation shaft. Accordingly, there is no need to provide a special area where the auxiliary magnets and the main magnets are fixed in the rotor, whereby the size of the rotor can be reduced.

Further, regarding a comparison of the shape of a cross section of the auxiliary magnets that is perpendicular to the rotation shaft direction with that of the main magnets, a ratio of the length of a part of the former shape that is extended further outwardly to the outer side of the radial direction from the outer periphery of the rotation shaft to the length of a part of the shape that is extended along the outer periphery of the rotation shaft is made larger than that of the latter shape. Reducing the number of poles of the Halbach array in the circumferential direction, that is, reducing the number of magnets that are aligned in the circumferential direction in the Halbach array rotor, is effective for downsizing the rotor. By making the auxiliary magnets have the aforementioned shape in the Halbach array rotor, even when the number of main magnets is reduced, it is possible to achieve high output of the electric motor.

Further, the cross section of the auxiliary magnets that is perpendicular to the rotation shaft direction may have a rectangular shape and the cross section of the main magnets that is perpendicular to the rotation shaft direction may have a sector form. In this way, by making the auxiliary magnets and the main magnets have a simple shape, the Halbach array rotor can be achieved by a simple structure.

Further, a distance from the center of the rotation shaft to an outer peripheral surface of the main magnets and a distance from the center of the rotation shaft to an end surface of an outer side of the radial direction of the auxiliary magnets may be made the same. According to this configuration, it is possible to easily align the main magnets between the projected parts of the auxiliary magnets that are adjacent to each other. Further, the electric motor using the rotor thus configured is able to achieve stable performance.

Further, the area of the cross section of the auxiliary magnets that is perpendicular to the rotation shaft direction may be made smaller than the area of the cross section of the main magnets that is perpendicular to the rotation shaft direction. This configuration is effective for downsizing the rotor.

Further, the auxiliary magnets may be arranged at equal angular intervals in the circumferential direction. The electric motor that uses the rotor thus configured is able to achieve stable performance.

A method of manufacturing a rotor according to one embodiment of the present disclosure is a method of manufacturing a rotor including a plurality of main magnets and a plurality of auxiliary magnets, the method including the steps of: attaching the auxiliary magnets to a plurality of grooves formed along a rotation shaft direction in an outer periphery of a rotation shaft in such a way that the auxiliary magnets are projected from the outer periphery of the rotation shaft to an outer side of a radial direction, a magnetization direction of the auxiliary magnets is along a circumferential direction of the rotor, and magnetic field directions of the auxiliary magnets that are adjacent to each other are opposite to each other in the circumferential direction; and attaching the main magnets between projected parts of the auxiliary magnets that are adjacent to each other in such a way that a magnetization direction of the main magnets is along a radial direction of the rotor, magnetic field directions of the main magnets that are adjacent to each other are opposite to each other in the radial direction, and the main magnets and the auxiliary magnets form a Halbach array in the circumferential direction of the rotor.

When the rotor is manufactured, first, the auxiliary magnets are fixed to the rotation shaft, and after that the main magnets are arranged between the projected parts of the auxiliary magnets that are adjacent to each other by the suction force between the rotation shaft and the main magnets, whereby it becomes extremely easy to assemble the auxiliary magnets and the main magnets.

According to the present disclosure, it is possible to provide a rotor that is downsized while achieving high output of the electric motor.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be explained with reference to embodiments of the present disclosure. However, the disclosure set forth in the claims is not limited to the following embodiments. Further, not all the structures explained in the embodiments may be necessary as means for solving the problem. For a purpose of clarifying the description, the following description and the drawings will be omitted and simplified as appropriate. Throughout the drawings, the same components are denoted by the same reference symbols and overlapping descriptions will be omitted as necessary. Right-handed xyz coordinates illustrated in the following drawings are provided to illustrate positional relationships among components, and the rotation shaft direction of an electric motor corresponds to a z-axis direction.

Figure 1:
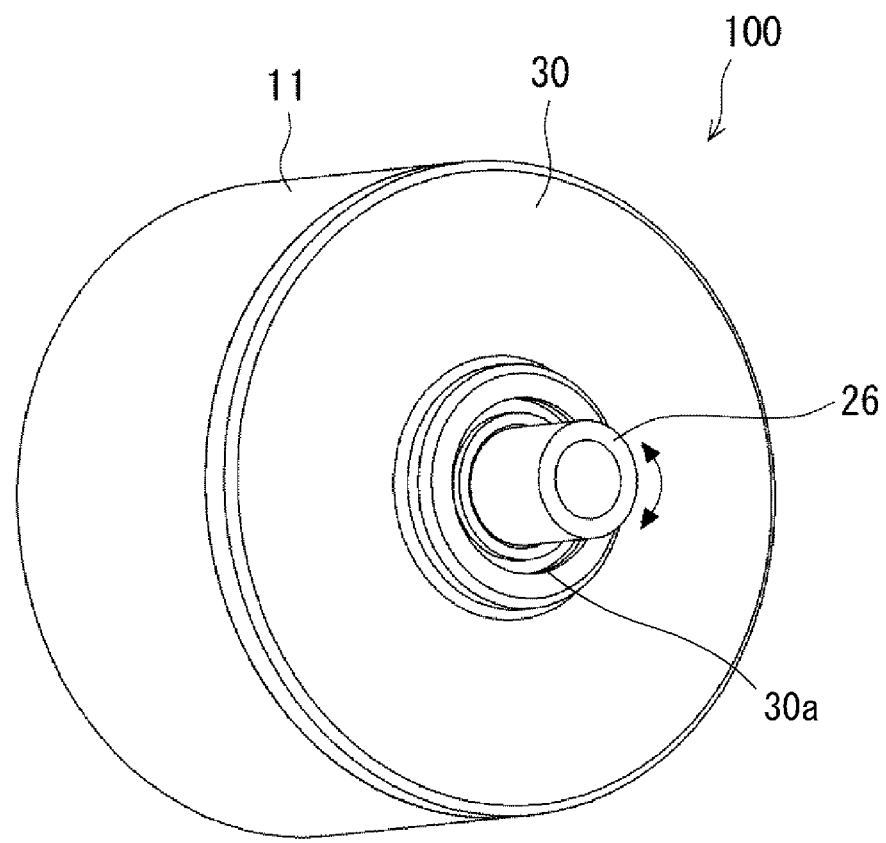
FIG. 1 is a perspective view of an electric motor including a rotor according to an embodiment.
Figure 2:
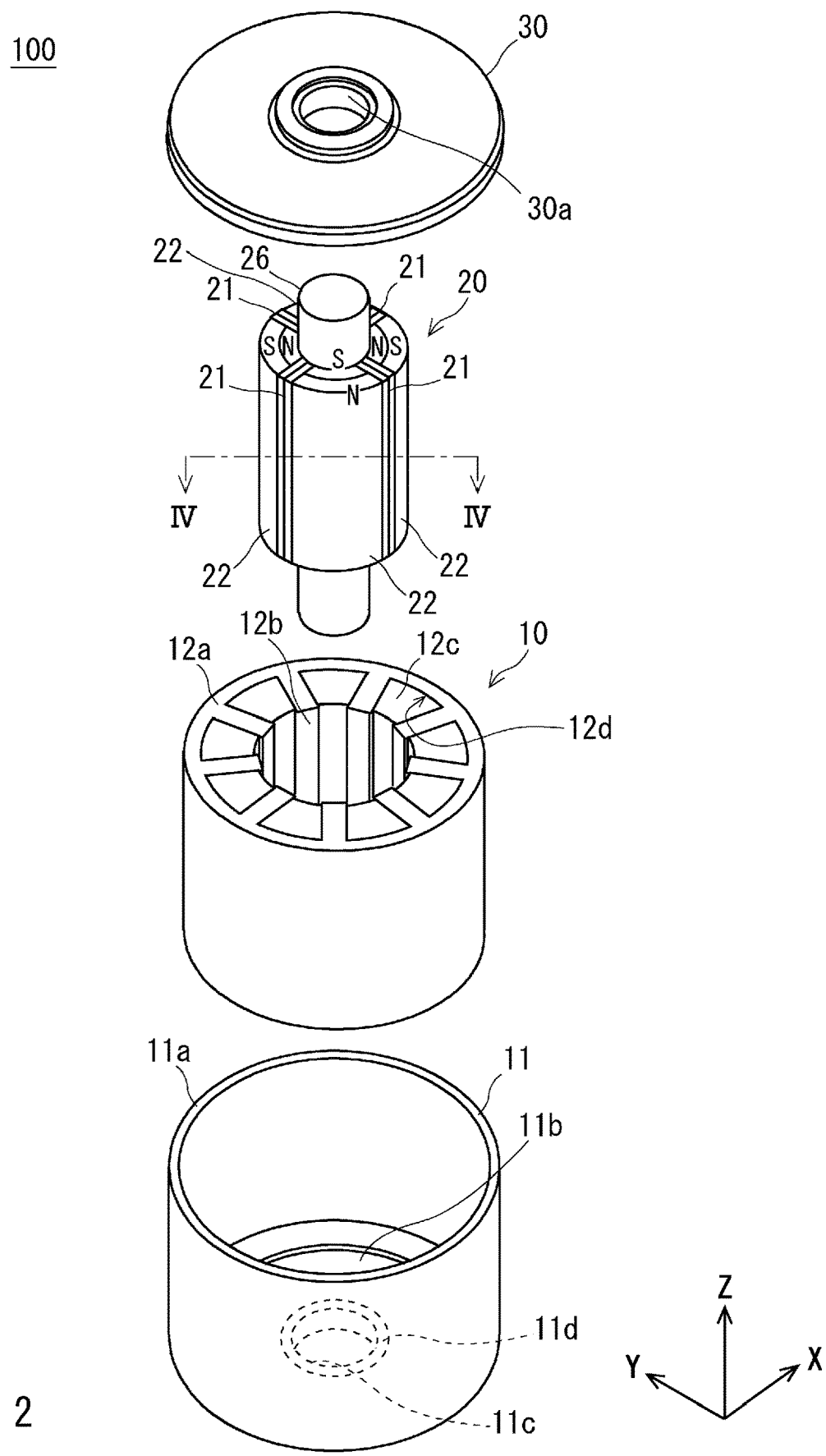
FIG. 2 is an exploded view of the electric motor including the rotor according to this embodiment.

First, a configuration of an electric motor including a rotor according to this embodiment will be described. FIG. 1 is a perspective view of the electric motor including the rotor according to this embodiment. FIG. 2 is an exploded view of the electric motor including the rotor according to this embodiment. As shown in FIG. 1, an electric motor 100 is covered with a housing 11 and a cover 30, which serve as a case. As shown in FIG. 2, a stator 10 and a rotor 20 are arranged inside the housing 11 and the cover 30. The electric motor 100 is a motor that rotationally drives the rotor 20, thereby transmitting a driving force to a target object via a rotation shaft 26.

The stator 10 includes a stator core 12a and coils 12c. The stator core 12a includes teeth 12b in which substantially cylindrical electromagnetic steel sheets are laminated in the rotation shaft direction (the Z-axis direction) and that are projected on an inner peripheral side of the stator core 12a and slots 12d provided between adjacent teeth 12b. The teeth 12b are bar-shaped parts that are extended along a radial direction of the rotor 20 (hereinafter this direction is simply referred to as a "radial direction"). The coils 12c are provided in the respective slots 12d. The plurality of coils 12c are coupled to each other in such a way that the electric motor 100 serves as a three-phase motor and are connected to respective power supplies (not shown).

The rotor 20 is arranged on the inner peripheral side of the stator 10. The rotor 20 includes a plurality of auxiliary magnets 21 and a plurality of main magnets 22. The auxiliary magnets 21 and the main magnets 22 may be, for example, rare earth-based permanent magnets including neodymium, iron, and boron as main components. The details of the configuration of the rotor 20 will be described later.

The housing 11, which is a cylindrical body, includes an opening 11a that is opened in one end thereof and a bottom part 11b that is closed in the other end thereof. The bottom part 11b includes a rotation shaft hole 11c and a bearing part 11d provided in the rotation shaft hole 11c. The cover 30, which is a plate-shaped body in which a rotation shaft hole 30a is formed, is arranged so as to close the opening 11a of the housing 11.

The rotation shaft 26 is arranged at the center of the rotor 20. One end side of the rotation shaft 26 contacts the cover 30 via a washer and the other end side of the rotation shaft 26 contacts the bearing part 11d provided in the housing 11 via a washer. The rotor 20 is held between the cover 30 and the bearing part 11d, whereby the position thereof in the rotation shaft direction becomes stable.

Figure 3:
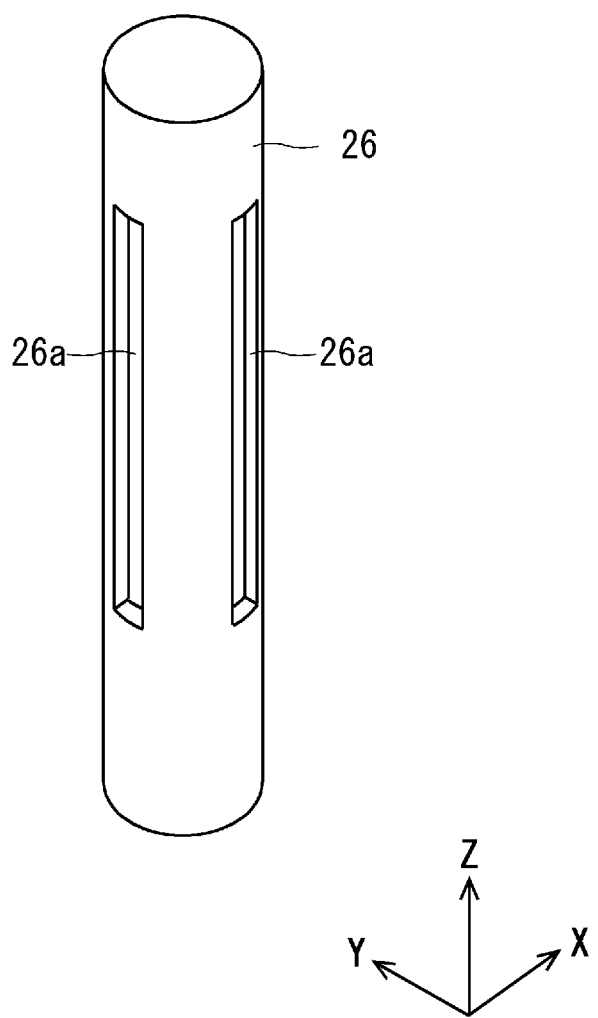
FIG. 3 is a perspective view showing a shape of a rotation shaft in the rotor according to this embodiment.

FIG. 3 is a perspective view showing the shape of the rotation shaft 26. As shown in FIG. 3, the rotation shaft 26 has a columnar shape and includes a plurality of grooves 26a formed along the rotation shaft direction (the Z-axis direction) in the outer periphery of the rotation shaft 26. The plurality of grooves 26a are formed at equal angular intervals with respect to the central line of the rotation shaft 26. In one example shown in FIG. 3, four grooves 26a are formed in the rotation shaft 26 at intervals of 90°.

Next, details of the configuration of the rotor 20 will be described.

Figure 4:
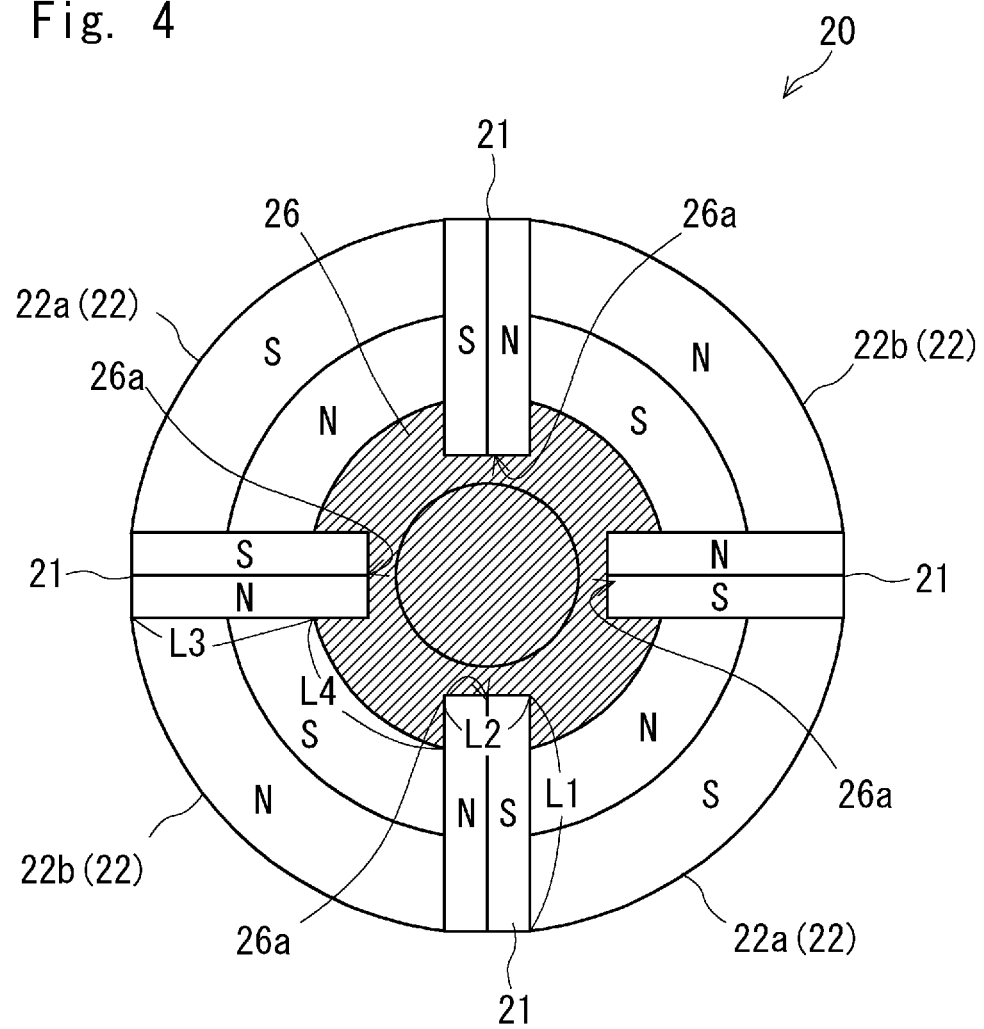
FIG. 4 is a cross-sectional view showing a detailed configuration of the rotor according to this embodiment.
Figure 4:
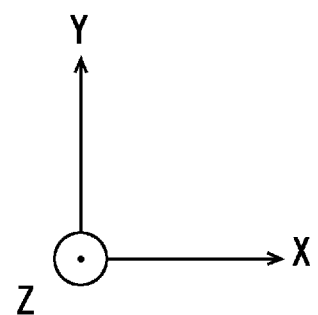

FIG. 4 is a cross-sectional view showing a detailed configuration of the rotor 20. FIG. 4 is a cross-sectional view taken along the line Iv-Iv of FIG. 2. As shown in FIG. 4, the auxiliary magnets 21 are fit into the plurality of respective grooves 26a formed on the outer periphery of the rotation shaft 26 along the rotation shaft direction, and are projected toward the outer side of the radial direction from the outer periphery of the rotation shaft. The main magnets 22 are arranged in the projected parts of the auxiliary magnets 21 that are adjacent to each other. The auxiliary magnets 21 are arranged in the circumferential direction of the rotor 20 (hereinafter this direction is simply referred to as a "circumferential direction") at equal angular intervals. In one example shown in FIG. 4, in the rotor 20, four auxiliary magnets 21 are arranged at intervals of 90°, and four main magnets 22 are arranged between the respective projected parts of the auxiliary magnets 21 that are adjacent to each other. When the auxiliary magnets 21 are arranged at equal intervals in the rotor 20, the electric motor 100 that uses the rotor 20 can achieve stable performance.

The magnetization direction of the auxiliary magnets 21 is the circumferential direction and the auxiliary magnets 21 are arranged in such a way that magnetization directions of the auxiliary magnets 21 that are adjacent to each other become opposite to each other. The magnetization direction of the main magnets 22 is a radial direction. The main magnets 22 are composed of main magnets 22a whose inner side of the radial direction (side of the rotation shaft 26) is an N pole and outer side of the radial direction is an S pole and main magnets 22b whose inner side of the radial direction (side of the rotation shaft 26) is an S pole and outer side of the radial direction is an N pole, and the main magnets 22a and the main magnets 22b are alternately arranged in the circumferential direction.

The plurality of main magnets 22 and the plurality of auxiliary magnets 21 are arranged in such a way that they form a Halbach array in the circumferential direction. By forming the Halbach array by the plurality of main magnets 22 and the plurality of auxiliary magnets 21 in the circumferential direction, it is possible to prevent the magnetic flux from the main magnets 22 from intruding into the side of the rotation shaft 26, whereby it is possible to improve the output of the electric motor 100.

As described above, the auxiliary magnets 21 are fit into the respective grooves 26a of the rotation shaft 26, whereby the auxiliary magnets 21 are rigidly positioned in the rotor 20. Further, when the main magnets 22 are arranged between the projected parts of the auxiliary magnets 21 that are adjacent to each other, the main magnets 22 are also rigidly positioned in the rotor 20 since the main magnets 22 receive a suction force from the rotation shaft 26. Therefore, there is no need to provide a special area for fixing the auxiliary magnets 21 and the main magnets 22 in the rotor 20, whereby the size of the rotor 20 can be reduced.

The present inventors have found that even when the length of the part of each of the auxiliary magnets 21 that is extended along the outer periphery of the rotation shaft 26 is reduced, it is possible to prevent the magnetic flux from the main magnets 22 from intruding into the side of the rotation shaft 26. With regard to this, regarding a comparison of the shape of the cross section of the auxiliary magnets 21 that is perpendicular to the rotation shaft direction with that of the main magnets 22, a ratio of the length of a part of the former shape that is extended further outwardly to the outer side of the radial direction from the outer periphery of the rotation shaft 26 to the length of a part of the shape that is extended along the outer periphery of the rotation shaft 26 is made larger than that of the latter shape. In the shape of the cross section of the auxiliary magnets 21 that is perpendicular to the rotation shaft direction, the aforementioned ratio R1 is L1/L2. In the shape of the cross section of the main magnets 22 that is perpendicular to the rotation shaft direction, this ratio R2 is L3/L4. That is, in the rotor 20, the aforementioned ratio R1 of the auxiliary magnets 21 is made larger than the aforementioned ratio R2 of the main magnets 22.

Reducing the number of poles of the Halbach array in the circumferential direction, that is, the number of magnets that are aligned in the circumferential direction, in the Halbach array rotor, is effective for increasing the speed of the electric motor 100. By making the above ratio R1 of the auxiliary magnets 21 larger than the above ratio R2 of the main magnets 22 in the Halbach array rotor 20, even when the number of main magnets 22 is reduced to about four, the output of the electric motor 100 can be made high.

The cross section of the auxiliary magnets 21 that is perpendicular to the rotation shaft direction has a rectangular shape and the cross section of the main magnets 22 that is perpendicular to the rotation shaft direction has a sector form. In this way, by making the shapes of the auxiliary magnets 21 and the main magnets 22 simple, the Halbach array rotor 20 can be obtained by a simple structure.

Further, from the viewpoint of downsizing the rotor 20, the area of the cross section of the auxiliary magnets 21 that is perpendicular to the rotation shaft direction is preferably made smaller than the area of the cross section of the main magnets 22 that is perpendicular to the rotation shaft direction. As described above, even when the length of the part of each of the auxiliary magnets 21 that is extended along the outer periphery of the rotation shaft 26 is reduced, it is possible to prevent the magnetic flux from the main magnets 22 from intruding into the side of the rotation shaft 26. Accordingly, even when the area of the cross section of the auxiliary magnets 21 that is perpendicular to the rotation shaft direction is made smaller than the area of the cross section of the main magnets 22 that is perpendicular to the rotation shaft direction, it is possible to prevent the magnetic flux from the main magnets 22 from intruding into the side of the rotation shaft 26.

Next, a method of manufacturing the rotor 20 will be described. In the following description, reference is made also to FIGS. 1 and 2.

Figure 5:
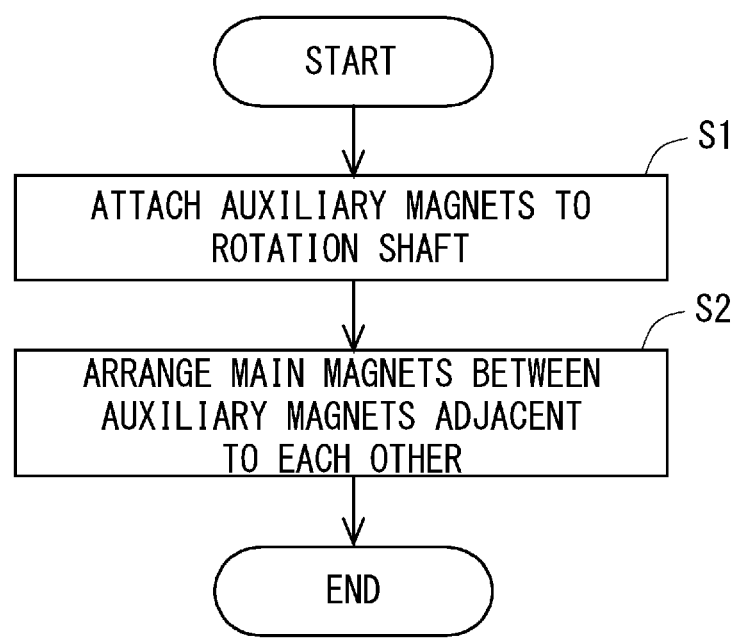
FIG. 5 is a flowchart showing an outline of a flow of a method of manufacturing the rotor according to this embodiment.

FIG. 5 is a flowchart showing the outline of a flow of the method of manufacturing the rotor 20. As shown in FIG. 5, first, the auxiliary magnets 21 are attached to the rotation shaft 26 (Step S1). Next, the main magnets 22 are arranged between the projected parts of the auxiliary magnets 21 that are adjacent to each other (Step S2).

Figure 6:
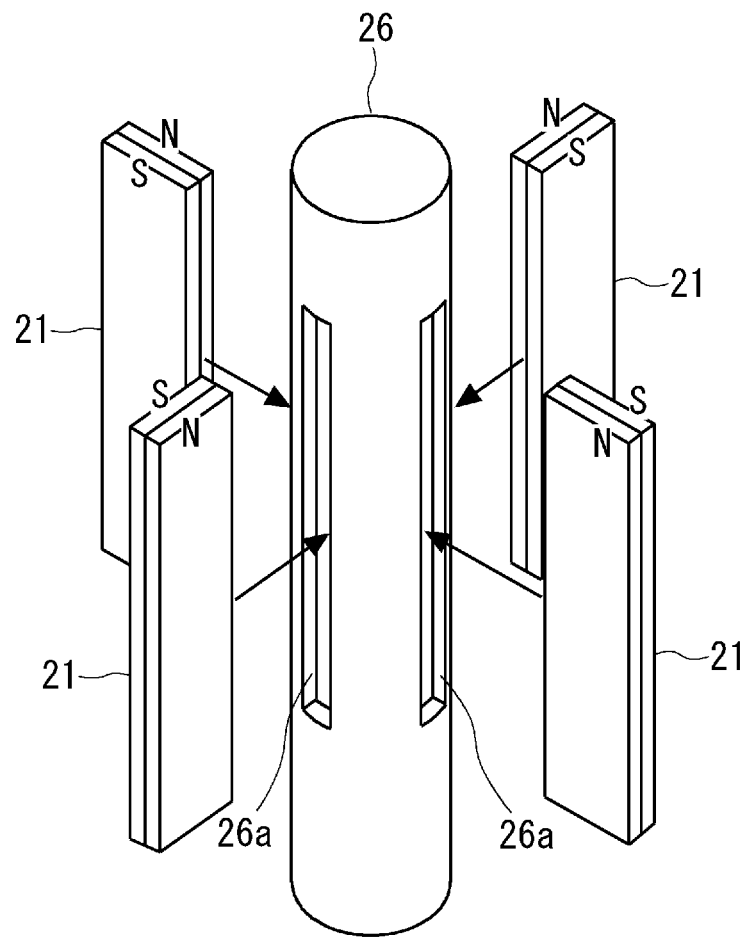
FIG. 6 is a diagram for specifically describing Step S1 shown in FIG. 5.

FIG. 6 is a diagram for specifically describing Step S1 in FIG. 5. As shown in FIG. 6, the auxiliary magnets 21 are attached to the grooves 26a of the rotation shaft 26 in such a way that the auxiliary magnets 21 are projected from the outer periphery of the rotation shaft 26 to the outer side of the radial direction and that the magnetization directions of the auxiliary magnets 21 are along the circumferential direction. Further, the auxiliary magnets 21 that are adjacent to each other are arranged in such a way that the magnetization directions thereof become opposite to each other in the circumferential direction.

Figure 7:
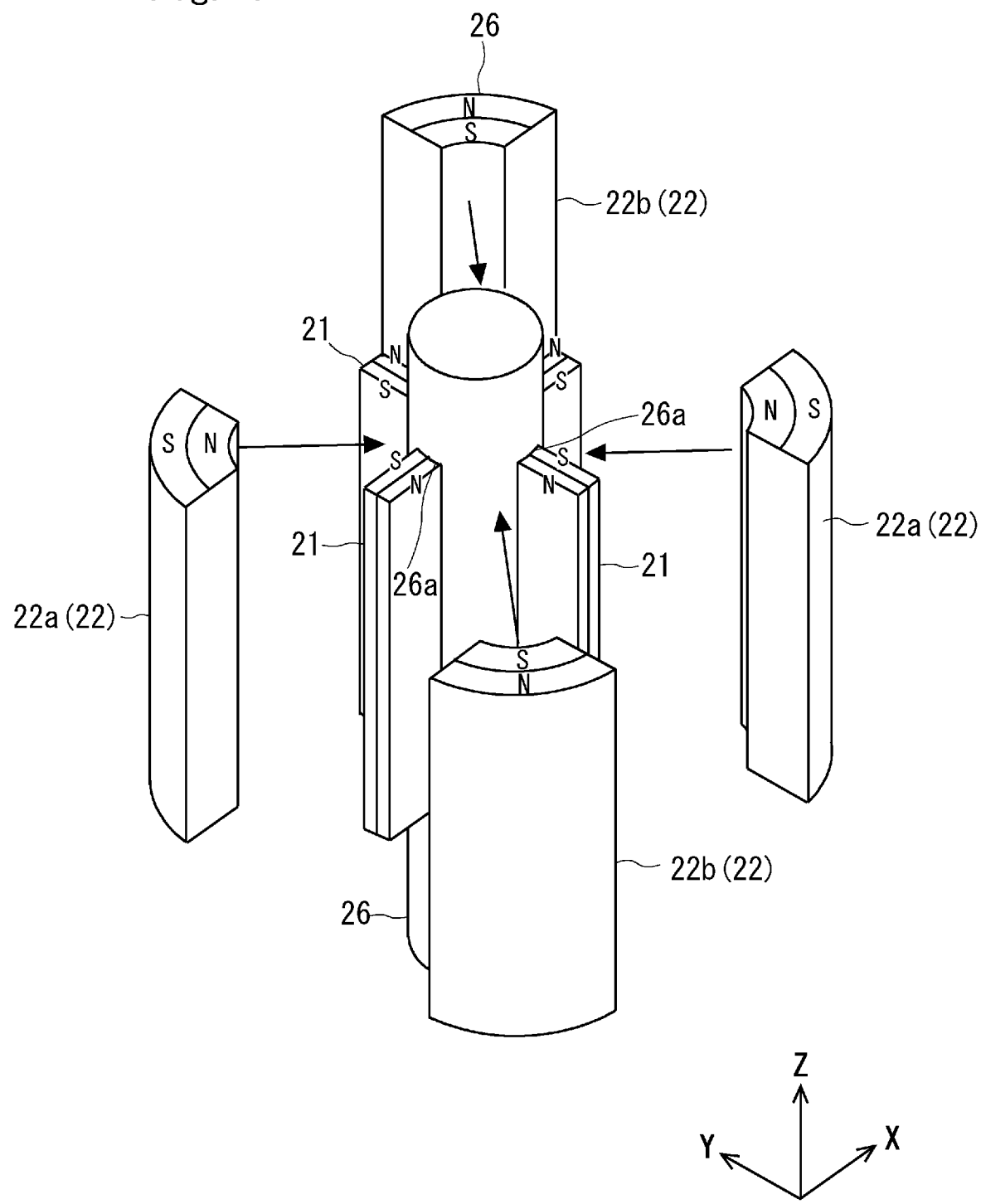
FIG. 7 is a diagram for specifically describing Step S2 shown in FIG. 5.

FIG. 7 is a diagram for specifically describing Step S2 in FIG. 5. As shown in FIG. 7, the main magnets 22 are arranged between the projected parts of the auxiliary magnets 21 that are adjacent to each other. As described above, the main magnets 22 are formed of the main magnets 22a whose inner side of the radial direction (side of the rotation shaft 26) is the N pole and outer side of the radial direction is the S pole and the main magnets 22b whose inner side of the radial direction (side of the rotation shaft 26) is the S pole and outer side of the radial direction is the N pole. In the circumferential direction, the main magnets 22a and the main magnets 22b are arranged in such a way that they are alternately arranged in the radial direction, that is, in such a way that magnetization directions of the main magnets 22 adjacent to each other are opposite to each other in the radial direction. Further, the main magnets 22a and the main magnets 22b are arranged in such a way that the main magnets 22a, the main magnets 22b, and the auxiliary magnets 21 form a Halbach array in the circumferential direction. The main magnets 22a and the main magnets 22b are each easily drawn into a space between the projected parts of the auxiliary magnets 21 that are adjacent to each other by the suction force between them and the rotation shaft 26.

In typical rotors in which the arrangement of the magnets is not the Halbach array, when the rotor is manufactured, after the rotor is formed of a metal that has not yet been magnetized, it is magnetized. On the other hand, in a rotor in which the magnets are arranged in the Halbach array, when the rotor is manufactured, it is required to assemble a number of magnets in such a way that the rotor includes the magnets that are arranged in the Halbach array since the rotor cannot be magnetized after it is formed. However, there is a problem that it is extremely difficult to arrange the respective magnets in desired positions due to repulsion or attraction between magnets.

On the other hand, in the rotor 20 according to this embodiment, first, the auxiliary magnets 21 are fixed to the rotation shaft 26, and then the main magnets 22 are arranged between the projected parts of the auxiliary magnets 21 that are adjacent to each other by the suction force between the rotation shaft 26 and the main magnets 22, whereby it is possible to assemble the auxiliary magnets 21 and the main magnets 22 extremely easily.

In order to enable the main magnets 22 to be easily aligned between the projected parts of the auxiliary magnets 21 that are adjacent to each other, it is preferable that the distance from the center of the rotation shaft 26 to the outer peripheral surface of the main magnets 22 and the distance from the center of the rotation shaft 26 to the end surface on the outer side of the radial direction of the auxiliary magnets 21 be made the same. Further, the electric motor 100 that uses the rotor 20 thus configured is able to achieve stable performance.

Next, results of a simulation of the magnetic flux density distribution of the electric motor according to this embodiment (Example) and that of an electric motor according to a comparative example will be described.

Figure 8:
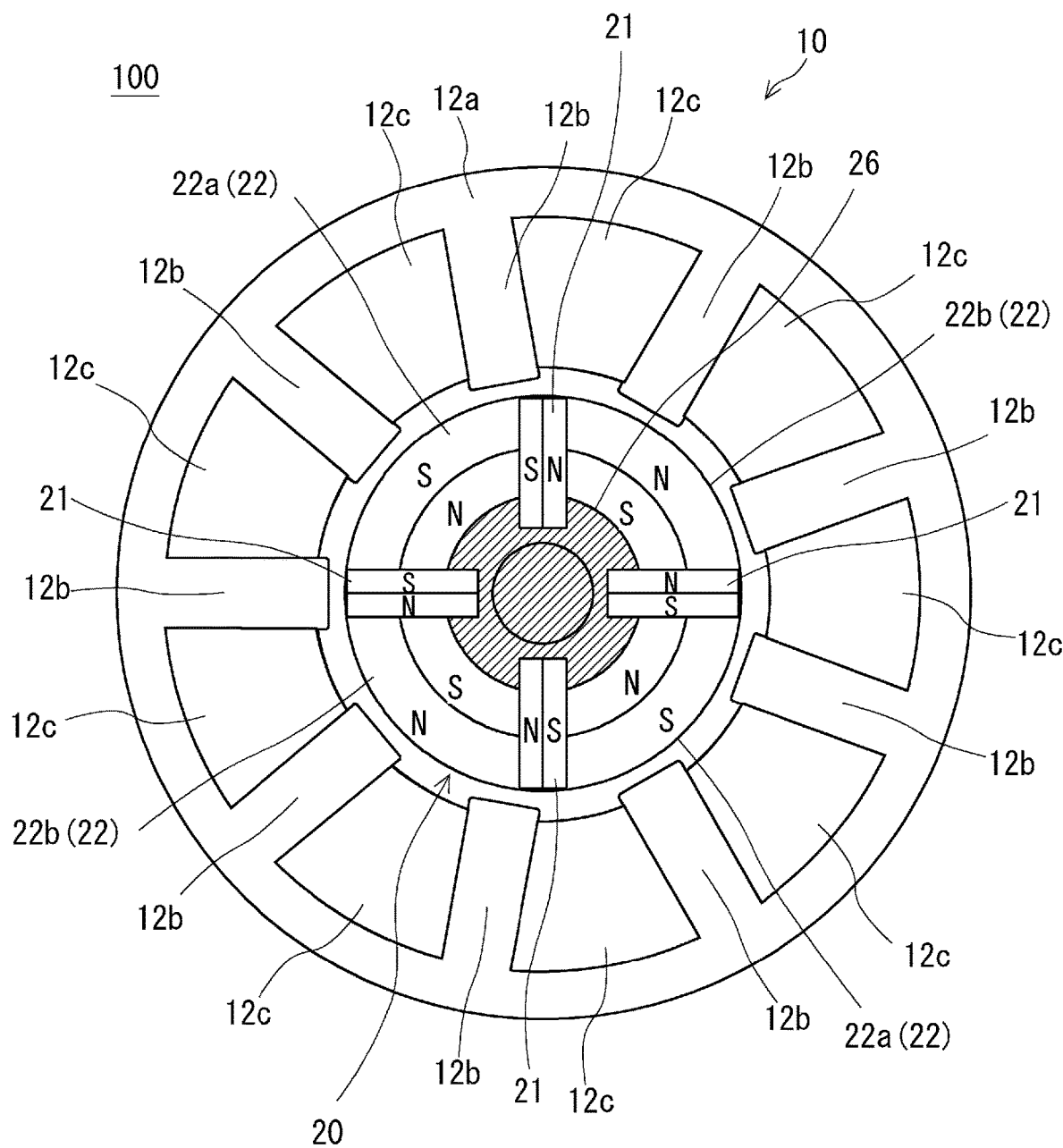
FIG. 8 is a schematic view of a simulation model of the electric motor including the rotor according to this embodiment.
Figure 8:
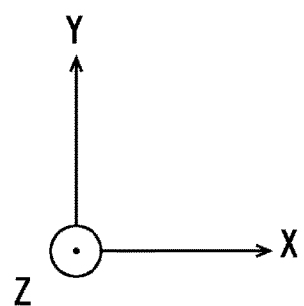

FIG. 8 is a schematic view of a simulation model of the electric motor including the rotor according to this embodiment. FIG. 8 shows a cross section of the electric motor 100 that is perpendicular to the rotation shaft direction. As shown in FIG. 8, in the electric motor 100, the rotor 20 is arranged on the inner peripheral side of the stator 10 in such a way that the gaps between the surface of the outer side of the radial direction of the auxiliary magnets 21 and the main magnets 22 and the teeth 12b become constant.

Figure 9:
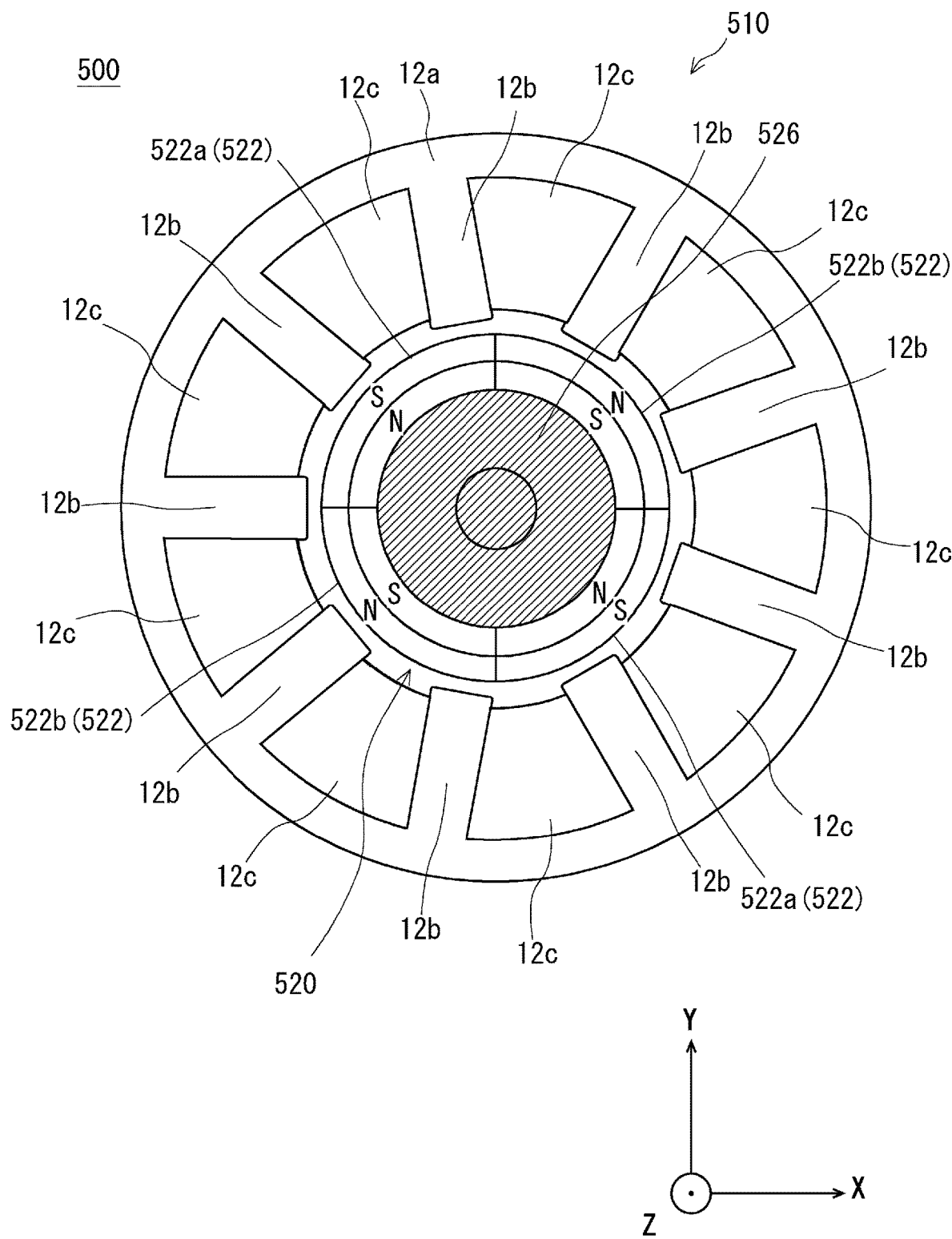
FIG. 9 is a schematic view of a simulation model of an electric motor including a rotor according to a comparative example.

FIG. 9 is a schematic view of a simulation model of the electric motor that includes a rotor according to the comparative example. FIG. 9, which corresponds to FIG. 8, shows a cross section of an electric motor 500 that is perpendicular to the rotation shaft direction. As shown in FIG. 9, the electric motor 500 includes a rotor 520 having a configuration in which main magnets 522 are arranged continuously in the form of a ring on an outer peripheral side of a rotation shaft 526. That is, the rotor 520 according to the comparative example is different from the rotor 20 according to this embodiment in that the rotor 520 according to the comparative example does not include auxiliary magnets. Note that the main magnets 522 of the rotor 520 according to the comparative example are composed of main magnets 522a and main magnets 522b whose magnetization directions are opposite to each other, like in the main magnets 22 of the rotor 20 according to this embodiment. That is, the inner side of the radial direction (the side of the rotation shaft 526) of the main magnets 522a is the N pole and the outer side of the radial direction thereof is the S pole, and the inner side of the radial direction (the side of the rotation shaft 526) of the main magnets 522b is the S pole and the outer side of the radial direction thereof is the N pole.

Figure 10:
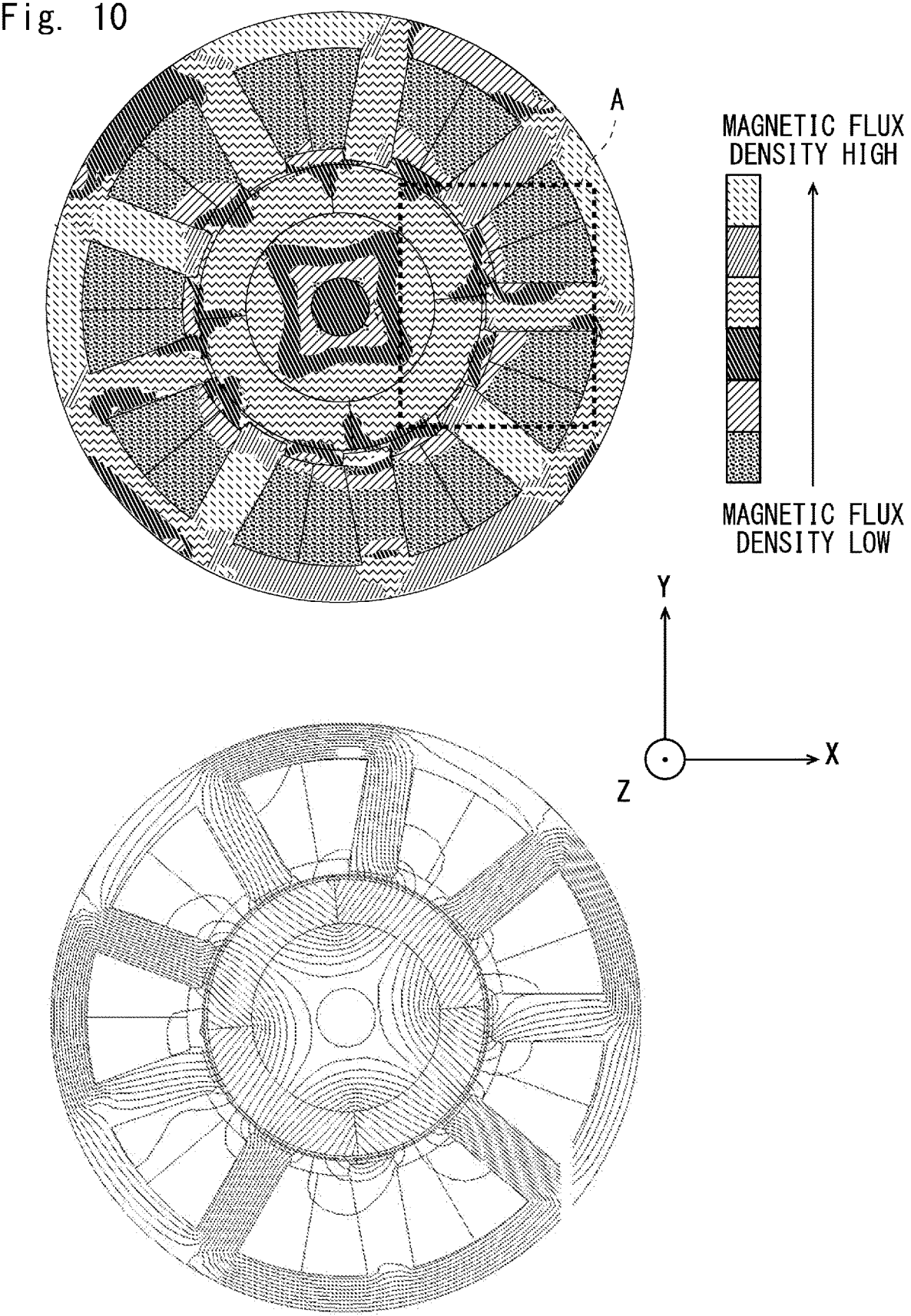
FIG. 10 is a diagram showing results of a simulation of magnetic flux density distribution in the cross section shown in FIG. 8 of the electric motor that includes the rotor according to this embodiment.
Figure 11:
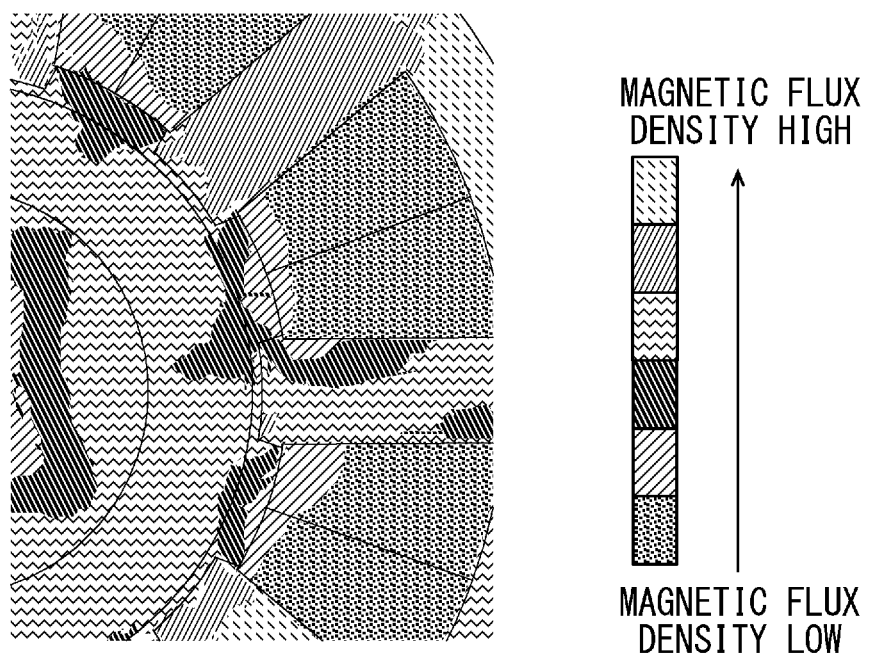
FIG. 11 is an enlarged diagram of an area A of FIG. 10.
Figure 12:
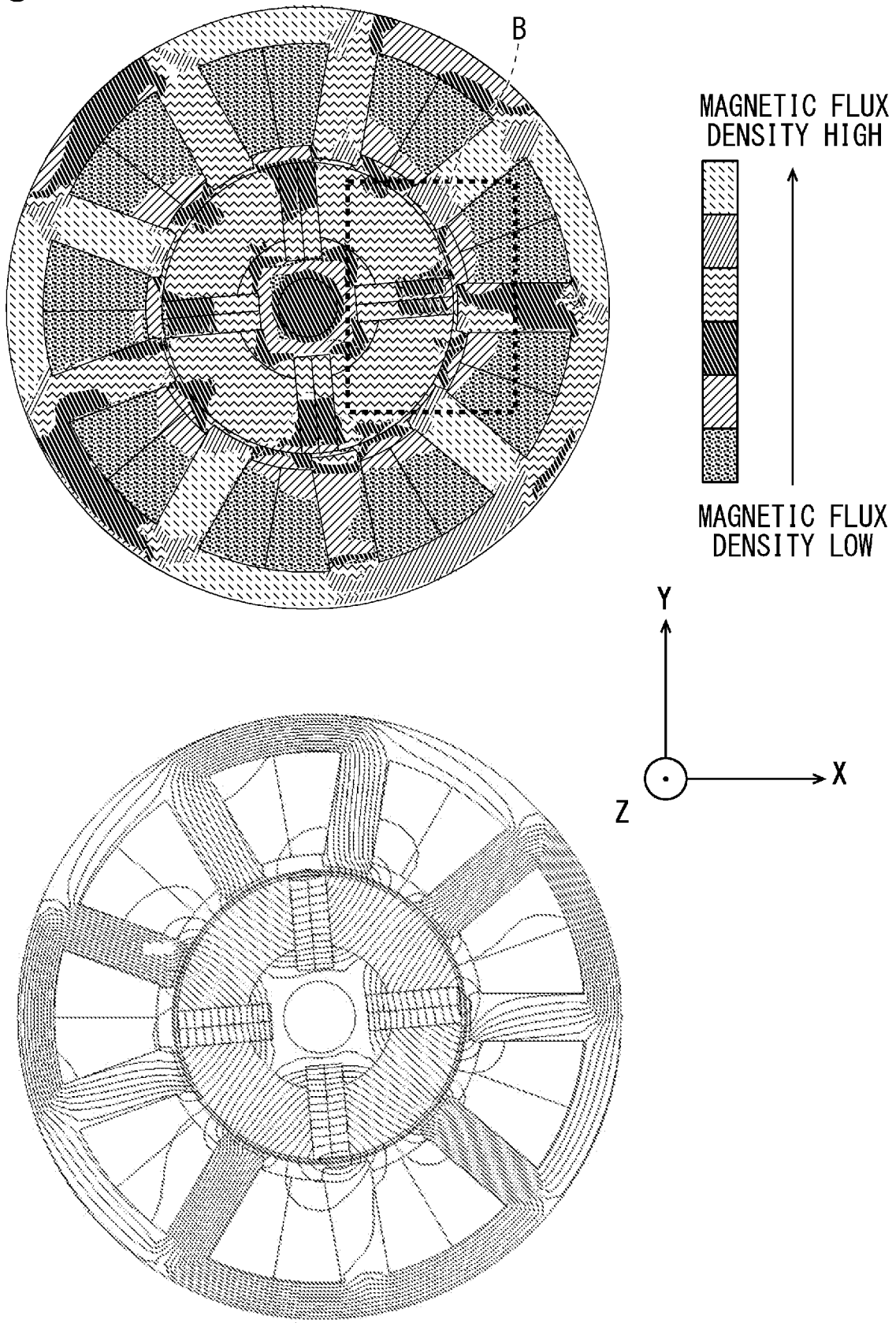
FIG. 12 is a diagram showing results of a simulation of magnetic flux density distribution in the cross section shown in FIG. 9 of the electric motor including the rotor according to the comparative example.
Figure 13:
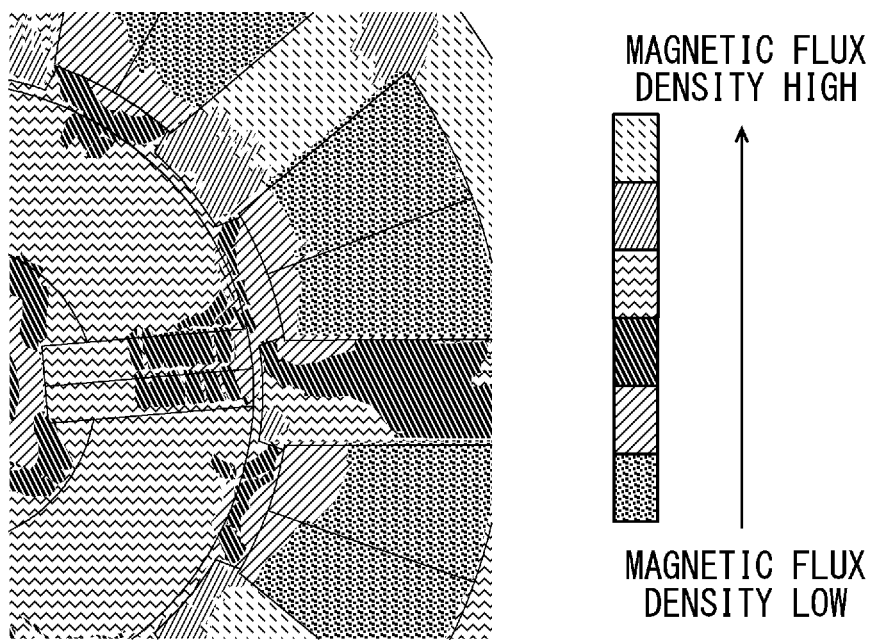
FIG. 13 is an enlarged diagram of an area B of FIG. 12.

FIG. 10 is a diagram showing results of a simulation of the magnetic flux density distribution of the electric motor 100 including the rotor 20 according to this embodiment in the cross section shown in FIG. 8. FIG. 11 is a diagram in which an area A shown in FIG. 10 is enlarged. FIG. 12 is a diagram showing results of a simulation of the magnetic flux density distribution of the electric motor 500 including the rotor 520 according to the comparative example in the cross section shown in FIG. 9. FIG. 13 is a diagram in which an area B shown in FIG. 12 is enlarged.

As shown in FIGS. 12 and 13, in the electric motor 500, the magnetic flux of the main magnets 522 greatly intrudes into the side of the rotation shaft 526. On the other hand, it is shown, in FIGS. 10 and 11, that the magnetic flux from the main magnets 22 is prevented from intruding into the side of the rotation shaft 26 in the electric motor 100, compared to the electric motor 500. That is, in the electric motor 100, the magnetic loss can be reduced more than that in the electric motor 500.

Figure 14:
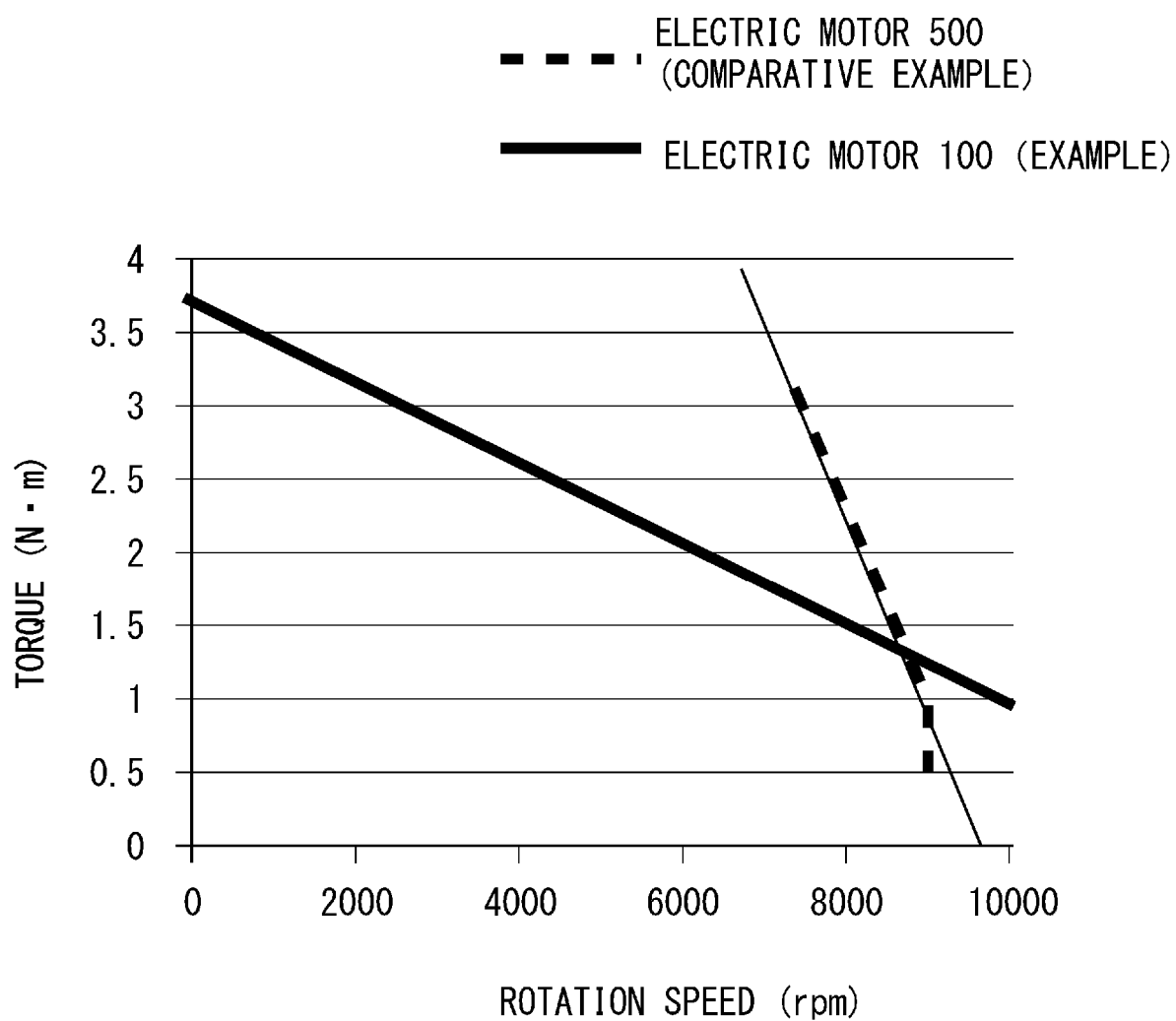
FIG. 14 is a graph showing results of a simulation of a relation between a rotation speed and torque of the electric motor including the rotor according to this embodiment and the electric motor including the rotor according to the comparative example.

FIG. 14 is a graph showing results of a simulation of the relation between a rotation speed and torque of the electric motor 100 including the rotor 20 according to this embodiment and the electric motor 500 including the rotor 520 according to the comparative example. In FIG. 14, the horizontal axis indicates the rotation speed [rpm] and the vertical axis indicates the torque [N·m]. The relation between the rotation speed and the torque in the electric motor 100 (Example) is shown by a solid line and the relation between the rotation speed and the torque in the electric motor 500 (comparative example) is shown by a dashed line. As shown in FIG. 14, the electric motor 500 cannot be rotated at a high rotation speed of about 10000 rpm. On the other hand, as shown in FIG. 14, in the electric motor 100, even when the electric motor 100 is rotated at a high rotation speed of about 10000 rpm, torque of about 1 N·m can be generated. Accordingly, the electric motor 100 including the rotor 20 according to this embodiment can be applied also to a motor that is rotated at a high speed.

As described above, in the rotor 20 according to this embodiment, the plurality of main magnets 22 and the plurality of auxiliary magnets 21 are arranged in such a way that the Halbach array is formed in the circumferential direction. By forming the Halbach array by the plurality of main magnets 22 and the plurality of auxiliary magnets 21 in the circumferential direction, it is possible to prevent the magnetic flux from the main magnets 22 from intruding into the side of the rotation shaft, whereby it is possible to improve the output of the electric motor 100. Since the auxiliary magnets 21 are fit into the respective grooves 26a of the rotation shaft 26, the auxiliary magnets 21 are rigidly positioned in the rotor 20. Further, when the main magnets 22 are arranged between the projected parts of the auxiliary magnets 21 that are adjacent to each other, the main magnets 22 are also rigidly positioned in the rotor 20 since the main magnets 22 receive the suction force from the rotation shaft. Accordingly, there is no need to provide a special area for fixing the auxiliary magnets 21 and the main magnets 22 in the rotor 20, whereby it is possible to downsize the rotor 20.

Figure 15:
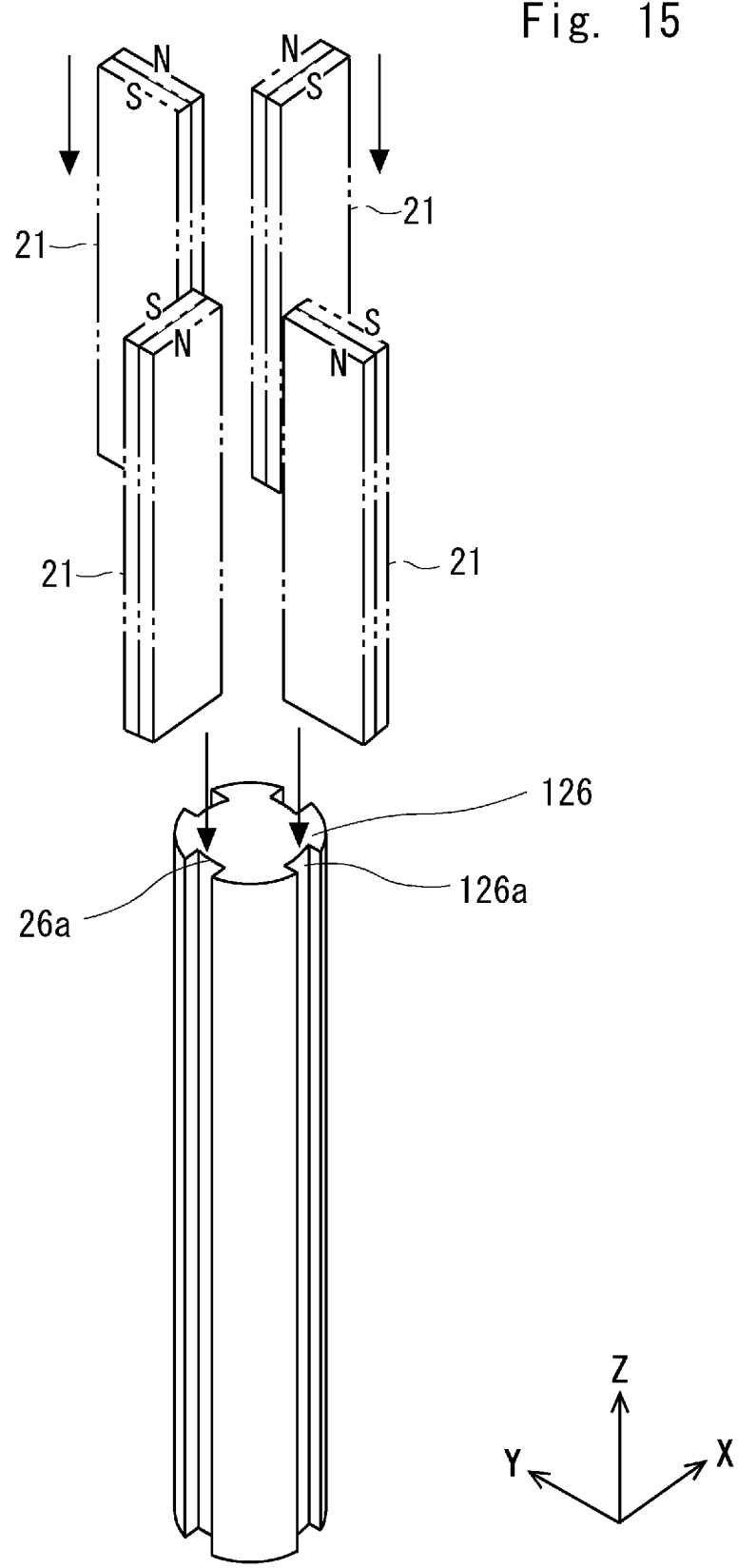
FIG. 15 is a perspective view showing a rotation shaft having a shape different from that of the rotation shaft shown in FIG. 3.

The present disclosure is not limited to the above embodiments and may be changed as appropriate without departing from the spirit of the present disclosure. It may be possible, for example, to make the rotation shaft have a shape different from that of the rotation shaft 26 shown in FIG. 3. FIG. 15 is a perspective view showing a rotation shaft 126 having a shape different from that of the rotation shaft 26 shown in FIG. 3. As shown in FIG. 15, the rotation shaft 126 has a columnar shape and includes a plurality of grooves 126a formed along the rotation shaft direction (the Z-axis direction) in the outer periphery thereof from one end (an end on the Z-axis direction positive side) of the rotation shaft 126 to the other end (an end on the Z-axis direction negative side) thereof. When the grooves 126a are formed along the rotation shaft direction from one end to the other end in the rotation shaft 126, the auxiliary magnets 21 that are slid from one end of the rotation shaft 126 can be attached to the rotation shaft 126, which eliminates the need for positioning the auxiliary magnets 21. It is therefore possible to easily attach the auxiliary magnets 21 to the rotation shaft 126.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method of manufacturing a rotor including a plurality of main magnets and a plurality of auxiliary magnets, the method comprising the steps of:
   attaching the auxiliary magnets to a plurality of grooves formed along a rotation shaft direction in an outer periphery of a rotation shaft in such a way that the auxiliary magnets are projected from the outer periphery of the rotation shaft to an outer side of a radial direction, a magnetization direction of the auxiliary magnets is along a circumferential direction of the rotor, and magnetic field directions of the auxiliary magnets that are adjacent to each other are opposite to each other in the circumferential direction; and
   attaching the main magnets between projected parts of the auxiliary magnets that are adjacent to each other in such a way that a magnetization direction of the main magnets is along a radial direction of the rotor, magnetic field directions of the main magnets that are adjacent to each other are opposite to each other in the radial direction, and the main magnets and the auxiliary magnets form a Halbach array in the circumferential direction of the rotor, the main magnets are each easily drawn into a space between the projected parts of the auxiliary magnets that are adjacent to each other by the suction force between them and the rotation shaft.

* * * * *